United States Patent
Zick et al.

(10) Patent No.: US 9,667,123 B2
(45) Date of Patent: May 30, 2017

(54) ELECTRIC MOTOR HAVING A THERMAL FUSE

(71) Applicant: BROSE FAHRZEUGTEILE GMBH & CO. KOMMANDITGESELLSCHAFT, WUERZBURG, Wuerzburg (DE)

(72) Inventors: Stefan Zick, Volkach (DE); Steffen Ehrmann, Aub (DE)

(73) Assignee: Brose Fahrzeugteile GmbH & Co. Kommanditgesellschaft, Wuerzburg, Wuerzburg (DE)

( * ) Notice: Subject to any disclaimer, the term of this patent is extended or adjusted under 35 U.S.C. 154(b) by 6 days.

(21) Appl. No.: 14/739,100

(22) Filed: Jun. 15, 2015

(65) Prior Publication Data

US 2015/0280531 A1   Oct. 1, 2015

Related U.S. Application Data

(63) Continuation of application No. PCT/EP2013/076638, filed on Dec. 16, 2013.

(30) Foreign Application Priority Data

Dec. 15, 2012 (DE) .................. 10 2012 024 604
Feb. 7, 2013 (DE) .................. 10 2013 002 155

(51) Int. Cl.
*H02K 11/00* (2016.01)
*H02K 7/14* (2006.01)
(Continued)

(52) U.S. Cl.
CPC ......... *H02K 11/0047* (2013.01); *H02K 11/25* (2016.01); *H01H 2037/762* (2013.01)

(58) Field of Classification Search
CPC .............. H02K 11/0047; H02K 11/25; H01H 2037/762
(Continued)

(56) References Cited

U.S. PATENT DOCUMENTS 4,789,800 A    12/1988  Zimmermann
5,612,662 A *   3/1997  Drekmeier ........... H01H 37/761
                                                              29/623
(Continued)

FOREIGN PATENT DOCUMENTS

DE        3626770 A1      2/1988
DE     198 00 234 A1      7/1998
(Continued)

OTHER PUBLICATIONS

English translation for EP 1657789; May 2006; Bjoren et al.*
English translation of DE102009046489; May 2011; Ilic et al.*

*Primary Examiner* — Terrance Kenerly
*Assistant Examiner* — Ahmed Elnakib
(74) *Attorney, Agent, or Firm* — Laurence A. Greenberg; Werner H. Stemer; Ralph E. Locher (57) ABSTRACT

An electric motor for driving a motor vehicle component, particularly a fan wheel for cooling coolant water, contains a rotor that is rotatably mounted opposite a stator, and an electronic system. The electronic system contains a punched grid provided with a plastic over-mold and a current path which conducts the motor current and has two current path ends spaced apart from one another forming an interruption point that is bridged by a thermal fuse. The thermal fuse has a spring-loaded contact bridge which is held so as to pivot about an axis that extends perpendicularly to the plane in which the interruption point lies.

12 Claims, 5 Drawing Sheets

(51) Int. Cl.
*H02K 11/25* (2016.01)
*H01H 37/76* (2006.01)

(58) Field of Classification Search
USPC .............................. 310/68 C, 71, 67 R, 68 R
See application file for complete search history.

(56) References Cited

U.S. PATENT DOCUMENTS

| | | | |
|---|---|---|---|
| 5,896,080 A * | 4/1999 | Chen | H01H 37/761 337/401 |
| 6,184,601 B1 | 2/2001 | Baer et al. | |
| 6,198,184 B1 | 3/2001 | Ohi et al. | |
| 6,737,770 B2 * | 5/2004 | Sunaga | H02K 11/33 310/68 C |
| 6,741,159 B1 * | 5/2004 | Kuczynski | H01H 37/002 337/142 |
| 8,633,621 B2 | 1/2014 | Muhl et al. | |
| 2002/0093259 A1 | 7/2002 | Sunaga et al. | |
| 2002/0153991 A1 | 10/2002 | Haeusel et al. | |
| 2008/0117016 A1 * | 5/2008 | Yu | H01H 37/761 337/401 |
| 2008/0297301 A1 * | 12/2008 | Onken | H01H 85/175 337/219 |
| 2009/0302992 A1 * | 12/2009 | Cernicka | H01C 7/126 337/412 |
| 2010/0290168 A1 * | 11/2010 | Wang | H01T 1/14 361/104 |

FOREIGN PATENT DOCUMENTS

| | | |
|---|---|---|
| DE | 699 24 514 T2 | 9/2005 |
| DE | 10 2009 036 578 B3 | 9/2010 |
| DE | 20 2010 002 664 U1 | 1/2011 |
| DE | 10 2009 046 489 A1 | 5/2011 |
| DE | 20 2010 009 326 U1 | 10/2011 |
| JP | 2002291215 | 10/2002 |
| KR | 1020060052614 A | 5/2006 |
| WO | 0221555 A1 | 3/2002 |

\* cited by examiner

ELECTRIC MOTOR HAVING A THERMAL FUSE

CROSS-REFERENCE TO RELATED APPLICATION

This is a continuation application, under 35 U.S.C. §120, of copending international application No. PCT/EP2013/076638, filed Dec. 16, 2013, which designated the United States; this application also claims the priority, under 35 U.S.C. §119, of German patent application Nos. DE 10 2012 024 604.8, filed Dec. 15, 2012, and DE 10 2013 002 155.3, filed Feb. 7, 2013; the prior applications are herewith incorporated by reference in their entirety.

BACKGROUND OF THE INVENTION

Field of the Invention

The invention relates to an electric motor, in particular a brushless electric motor, for driving a motor vehicle component. The electric motor contains a rotor mounted rotatably relative to a stator and an electronics system, which has a punched grid provided with a plastic over-mold and a current path which conducts the motor current and has two current path ends spaced apart from one another forming an interruption point that is bridged by a thermal fuse. The thermal fuse has a spring-loaded contact bridge. In particular, a vehicle component is understood to be a fan wheel for cooling coolant water.

German utility model DE 20 2010 002 664 U1 discloses an electric motor, in particular a DC motor, for driving a motor vehicle component, particularly a fan motor for cooling coolant water, having a rotor and a commutator, against which a brush bears with contact. A punched grid over-molded with plastic forms a current path impressed into an electrical isolation, the current path being connected to a brush. The current path, which conducts the motor current, is interrupted so as to form two current path ends spaced apart from one another, and the interruption point is bridged by a contact spring as thermal fuse.

German patent DE 10 2009 036 578 B3 relates to a thermal fuse, in particular for a power module of a motor vehicle. The thermal fuse has a conductive path, which is arranged on a circuit board and is interrupted by an interruption point, and which has a first conductive path portion and a second conductive path portion in each case adjacent to the interruption point. A contact bridge, which is arranged in the region of the interruption point, has a first contact portion and a second contact portion arranged opposite one another. The contact portions are secured in a first position to the conductive path portions by solder at soldered points. The contact bridge is acted on in the first contact position by a spring force, in such a way that the contact portions are separated from the corresponding conductive path portions when the melting point of the solder is reached. The thermal fuse also has a spring element, which, when the melting point of the solder is reached, causes a movement of the contact bridge, which extends parallel to the circuit board. In the second or tripped position the contact bridge is held in a cage without contacting the first conductive path portion.

SUMMARY OF THE INVENTION

The object of the invention is to specify an electric motor, in particular a brushless electric motor, for driving a motor vehicle component, particularly a fan wheel for cooling coolant water containing a thermal fuse, which on the one hand requires a low component part outlay, and with which on the other hand a simple and/or effective arrangement of the component parts in the manufacturing process is enabled.

For this purpose, the electric motor has a rotor that is mounted rotatably relative to a stator, an electronics system with a punched grid provided with a plastic over-mold having a current path which conducts the motor current. The current path has two current path ends spaced apart from one another forming an interruption point. A thermal fuse has a spring-loaded contact bridge for bridging the interruption point, wherein the contact bridge is held pivotably about an axis that extends perpendicularly to the plane in which the interruption point lies.

In an advantageous embodiment of the electric motor the contact bridge pivots about the pivot axis in the plane of the interruption point. A possibility for the space-saving arrangement of the thermal fuse inclusive of the contact bridge and of the spring element and contact bridge is thus made possible.

In accordance with an expedient development the contact bridge is associated with a separate spring element having a first spring leg and having a second spring leg extending at least approximately at right angles hereto. A structurally simple and particularly effective spring element can thus be provided and placed in the arrangement.

In accordance with a preferred variant the spring legs transition into one another via a spring or leg eyelet, which in particular is open. The spring can thus be arranged pivotably in an axis on a shaft element, for example a pin or the like, and a favorable configuration of the spring can be produced. In the assembled state the spring eyelet of the spring element surrounds the pivot axis coaxially. A joint pivoting of the spring element, or spring leg thereof cooperating with the contact bridge, and the contact bridge about the same pivot axis is thus provided easily and also reliably.

In a further favorable embodiment the first spring leg lies in a storage compartment of the plastic over-mold, whereas the second spring leg bears against the contact bridge under a spring preload. In the starting state the spring legs of the spring element are arranged relative to one another at a suitable angle, such that in the installed state the spring legs are preferably arranged perpendicularly to one another when the second spring leg bears against the contact bridge. The preload of the contact bridge by the spring element is thus produced in a simple and also reliable manner. The separate spring element is suitably fabricated from round wire or flat wire in the manner of a leg spring. An economical possibility is thus provided for producing the spring element.

In accordance with an expedient development the spring element and the contact bridge are coupled via a guide element. The contact bridge is thus guided reliably while it passes through the pivot path. For this purpose, the guide element is suitably formed by a groove in the first spring leg and a spring on the contact bridge. A favorable and practical implementation of the spring element is thus provided, which also enables simple handling with regard to the assembly of the component parts.

In accordance with a suitable embodiment the first spring leg of the spring element is bent at the leg end. A stable hold of the spring element on the contact bridge is thus provided.

In a further advantageous embodiment the pivot axis is shaped in the form of a pin from the plastic over-mold. As a result of this structure, the possibility is created that the spring element, in contrast to the contact bridge, itself is not an active component of the thermal fuse or is only insignificantly an active component of the thermal fuse, such that an electrical current flow is provided only via the contact bridge. The current flow therefore is not influenced by the mechanical properties of the contact bridge.

The contact bridge advantageously has, at both ends, contact surfaces contacted with the respective current path ends, wherein the pivot axis lies in the region of the contact surfaces. The possibility is thus created of bridging the interruption point for conduction, soldering the contact bridge at the current path ends, and at the same time also producing the pivotability of the contact bridge.

Both contact surfaces of the contact bridge are suitably soldered to the current path ends. On the one hand a particularly reliable electrical transfer capability of the current via the contact bridge is thus provided. On the other hand the contact bridge is fixed to the current path ends mechanically reliably. In the case of overheating the solder in the region of both current path ends melts practically at the same time, such that the contact bridge in the event of tripping can be pivoted out about the pivot axis and in the plane of the interruption point. The melted solder joints are practically sheared off during this process, which ensures a reliable interruption of the interruption or contact point bridged by the thermal fuse or contact bridge thereof.

In an expedient variant the contact bridge is configured as, or in the manner of a punched and bent part having a number of bends, which form a middle raised bridge portion. The desired mechanical and/or electrical properties of the contact bridge can thus be provided in a simple manner. In particular, the contact bridge can be adapted to different amperages.

The advantages associated with the invention in particular lie in the fact that a simple, favorable and space-saving possibility for integration of the thermal fuse in the electric motor is created by a tripping of the thermal fuse in the plane of the interruption point.

Other features which are considered as characteristic for the invention are set forth in the appended claims.

Although the invention is illustrated and described herein as embodied in an electric motor having a thermal fuse, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Parts corresponding to one another are provided in all figures with the same reference signs.

Figure 1:
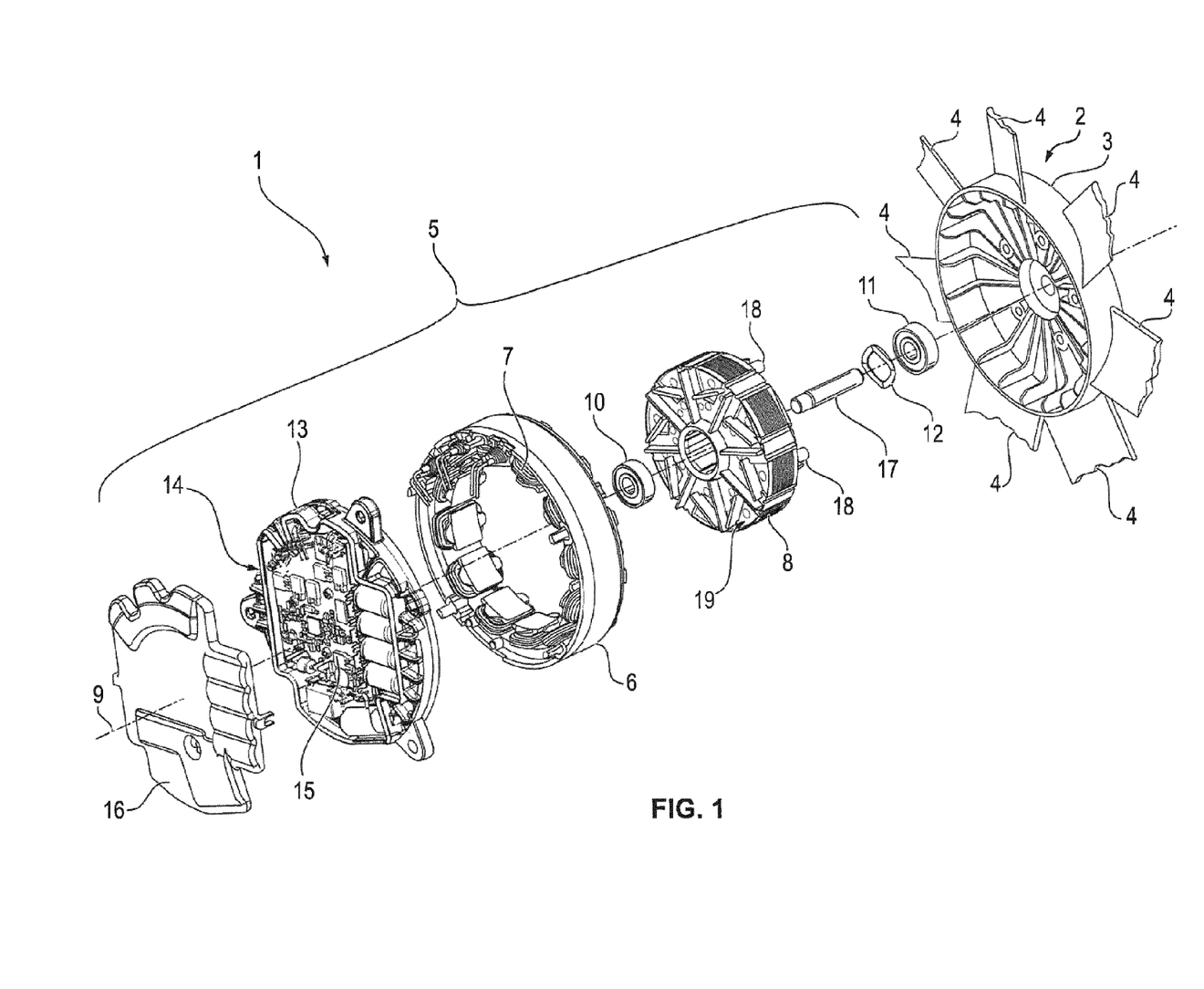
FIG. 1 is a diagrammatic, exploded perspective view of a cooler fan for a motor vehicle with a brushless internal rotor motor with integrated converter electronics system according to the invention.

Referring now to the figures of the drawings in detail and first, particularly to FIG. 1 thereof, there is shown a fan 1 for a radiator of a motor vehicle in a state removed from one another. The fan 1 includes a fan wheel 2 with a central cap 3, around an outer circumference of which air-guiding blades 4 (illustrated only in part) are arranged in an evenly distributed manner. The fan 1 also has an electric motor 5, also referred to as a fan motor, by which the fan wheel 2 is driven in rotation.

The motor 5 is formed generally by a stator 6, which is wound with a three-phase rotary field winding 7 in the form of coils. The motor 5 also includes a permanently excited rotor 8, which is mounted rotatably about a motor axis 9 in an interior of the stator 6. In order to mount the rotor 8, the motor 5 has two rolling bearings 10 and 11, which act on the rotor 8 from axially opposite sides. The axial play of the rotor 8 between the two rolling bearings 10 and 11 is spring-loaded here by a spring ring 12.

The motor 5 also has an approximately disk-shaped motor mount 13. An electronics compartment 14 is formed in the motor mount 13 on an end face facing away from the fan wheel 2, a converter electronics system 15 being inserted into the electronics compartment 14. In order to tightly close the electronics compartment 14, the motor 5 contains an electronics compartment lid 16, also referred to hereinafter as a housing lid.

The rotor 8 is formed (in a manner not illustrated in greater detail) by a laminated core, into which permanent magnets are inserted in order to generate an exciting field, wherein the laminated core together with the inserted permanent magnets is over-molded by a plastic coating. Similarly, the stator 6 also consists of a laminated core that is over-molded by a plastic coating.

The motor mount 13 is formed in particular by a one-piece die-cast part made of aluminum. The electronics compartment lid 16 is preferably an injection molded part made of plastic.

On the front side thereof, the rotor 8 is provided with four screw domes 18, by which the rotor 8 is screwed to the fan wheel 2 in the assembled state. The motor 5 and therefore the entire fan 1 is secured to the vehicle via the motor mount 13, which for this purpose is provided with three screw tabs 19 protruding from the outer circumference of the mount. The motor 5 is a brushless, self-cooled internal rotor motor.

Figure 2:
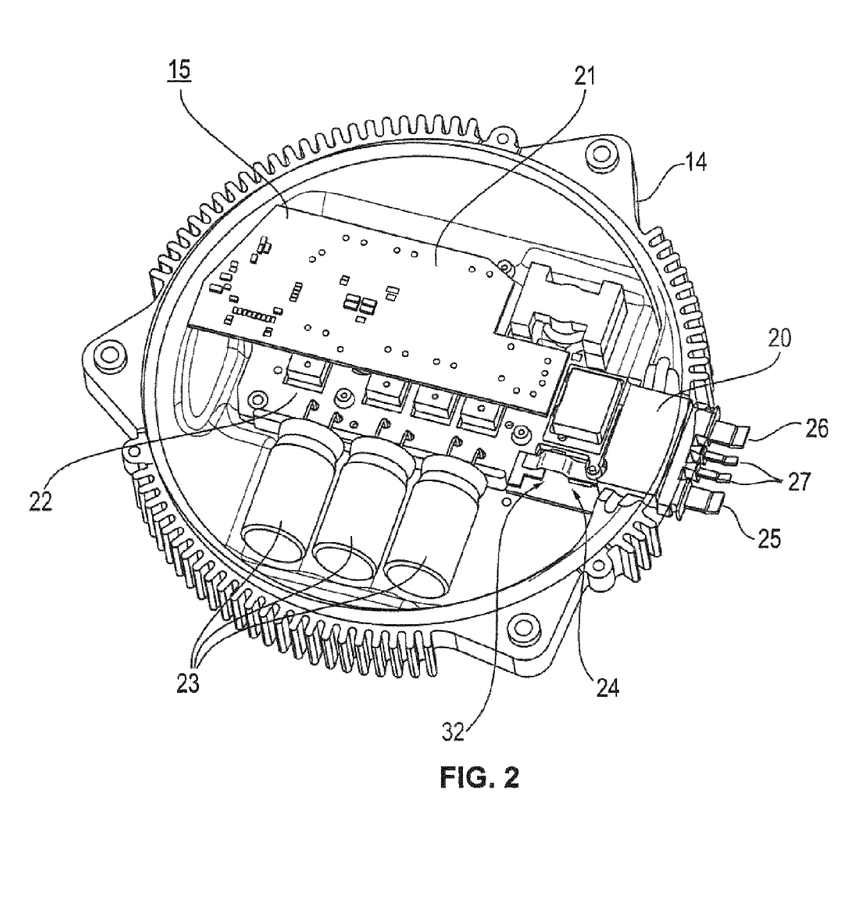
FIG. 2 is a perspective view of an electronics compartment with an electronics system of an electric motor, with a printed circuit board and a punched grid provided with a plastic over-mold, and with a thermal fuse.

FIG. 2 shows a perspective illustration of the electronics compartment 14 with inserted electronics system 15. The electronic system 15 has an over-molded punched grid 20 and a circuit board or printed circuit board 21 fitted with electrical component parts. The electric motor 5 is operated by a bridge circuit (B6 circuit), which is implemented in the over-molded punched grid 20. For this purpose the over-molded punched grid 20 has a number of switchable semiconductor components 22, by which current is supplied alternately to the three phase windings of the field winding 7 of the electric motor 5. The electrical current used for this purpose is provided by a DC source in a manner not illustrated in greater detail.

The three phase windings of the field winding 7 of the electric motor 5 are connected for example in a delta connection via capacitors 23. In other words each two electrically adjacent phase windings are electrically connected to one another at a motor-side contact point and in each case are in turn electrically contacted via a bridge-side contact point to a bridge branch of the bridge circuit. The windings are produced from a lacquered copper wire and are wound centrally to form a coil.

The over-molded punched grid 20, additionally to the semiconductor components 22 and the capacitors 23, also has a thermal fuse 24. The thermal fuse 24 protects the electric motor 5 against overheating and fire risk. If the motor 5 overheats, the thermal fuse 24 thus trips, and current can no longer flow to or from the motor 5. Connections 25, 26 and 27 form an input connection and an output connection for the motor current and two sensor signal outputs, for example for the measurements of the rotational speed (number of revolutions), the direction of rotation and/or the position of the motor 5.

Figure 3A:
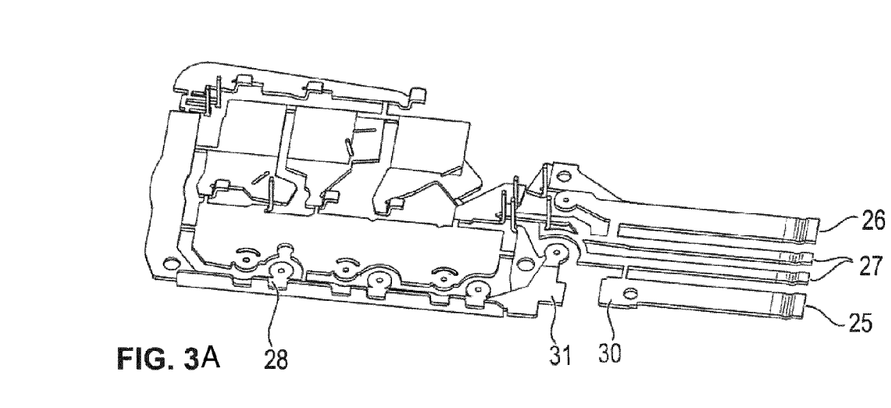
FIGS. 3A and 3B are perspective views of a punched grid before and after the plastic over-mold inclusive of an interruption point to be bridged by the thermal fuse.
Figure 3B:
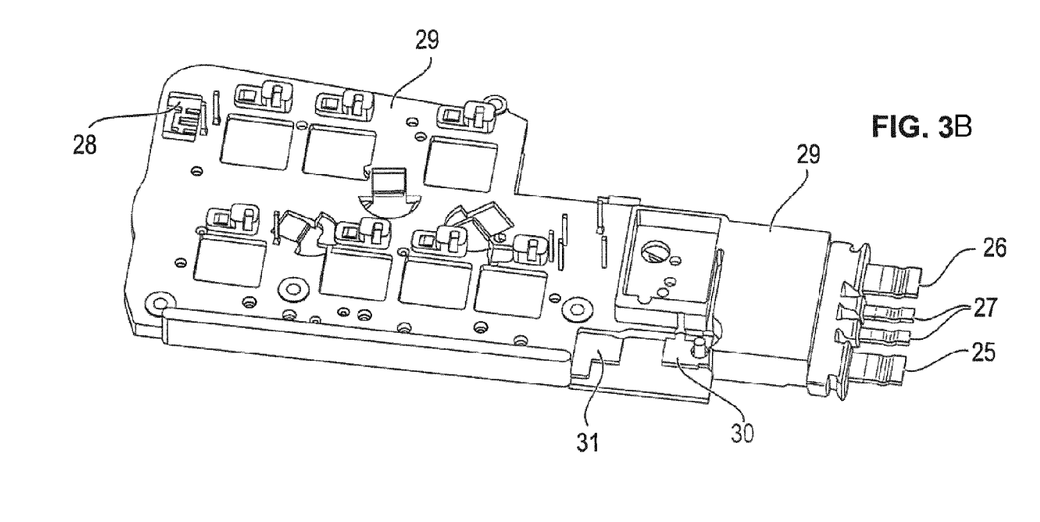

As is shown in FIG. 2 together with FIGS. 3A, 3B, the input connection 25 is connected to the semiconductor components 22 via the capacitors 23. A punched grid 28 (see FIG. 3A) provides conductive paths and is electrically insulated by a plastic over-mold 29 (see FIG. 3B). The punched grid 28 or these conductive paths conducts/conduct the motor current $I_M$.

Figure 4:
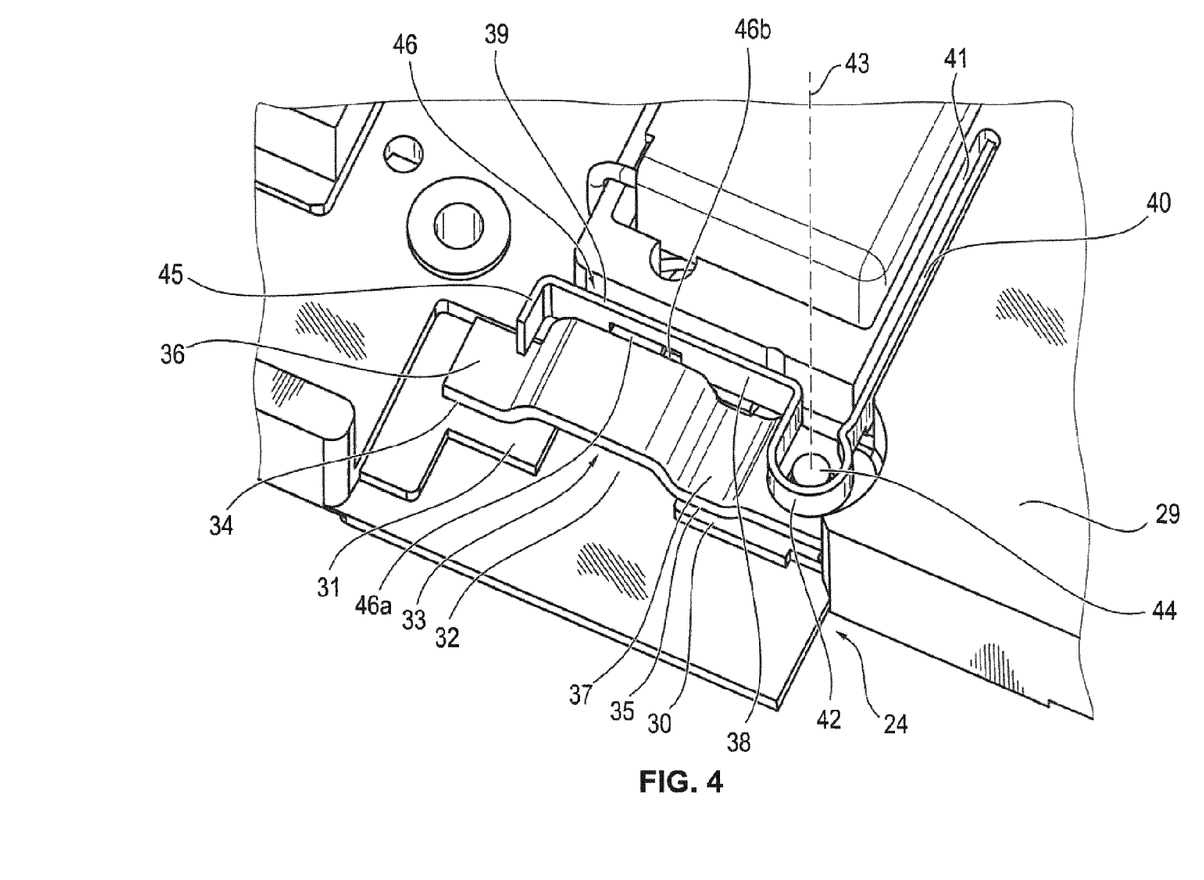
FIG. 4 is a perspective view of a detail of the electronics system with the thermal fuse.

FIG. 4 shows the thermal fuse 24 in an enlarged illustration. The thermal fuse 24 connects the current path ends 30, 31 conducting the motor current $I_M$ to one another via an interruption point 32 of the punched grid 28. The thermal fuse 24 is formed from a contact bridge 33, which connects two contact points 34, 35 of the punched grid 28 to one another. The contact bridge 33 itself has contact points 36 and 37, which are connected by a soldered joint to the contact points 34, 35 of the punched grid 28. The soldered points contact the current path ends 30 and 31 to one another electrically via the contact bridge 33 and connect the contact bridge 33 mechanically to the contact points 34 and 35 to form a mechanically fixed connection.

In order to provide the function of the thermal fuse 24, a separate spring element 38 is provided, which preloads the contact bridge 33 by a first spring leg 39 and is inserted in a storage compartment 41 of the plastic over-mold 29 by a second spring leg 40. The spring element 38 is deformed in this position in such a way that the spring legs 39 and 40 are arranged practically at right angles relative to one another. Both spring legs 39 and 40 are interconnected via a leg eyelet 42.

The spring element 38 and the contact bridge 33 are also mounted rotatably about an axis 43, which is perpendicular to the plane in which the interruption point 32 lies. The axis 43 is formed from the over-mold 29 as a rotary or pivot pin 44. Here, the leg eyelet 42 is arranged coaxially with respect to the pin 44 and thus with respect to the pivot axis 43.

The contact bridge 33 is formed in the manner of a punched and bent part having a number of bends, which form a middle raised bridge portion. The spring element 38 can be produced from round wire or also flat wire. No current flows via the spring element 38, since the pin 44 is formed from the insulating over-mold and the spring element 38 is fitted thereon.

The first spring leg 39 of the spring element 38 has a bend 45 at the leg end, which bend guides the contact bridge 33 in the event of tripping. In addition, the thermal fuse 24 also contains a guide element 46 in the form of a groove/spring connection. Here, the spring element 38 in the event of tripping guides the contact bridge 33 during the pivot over the pivot path thereof. The groove 46a is formed here on the contact bridge 33, and the spring 46b is located on the first spring leg 39 of the spring element 38.

Figure 5A:
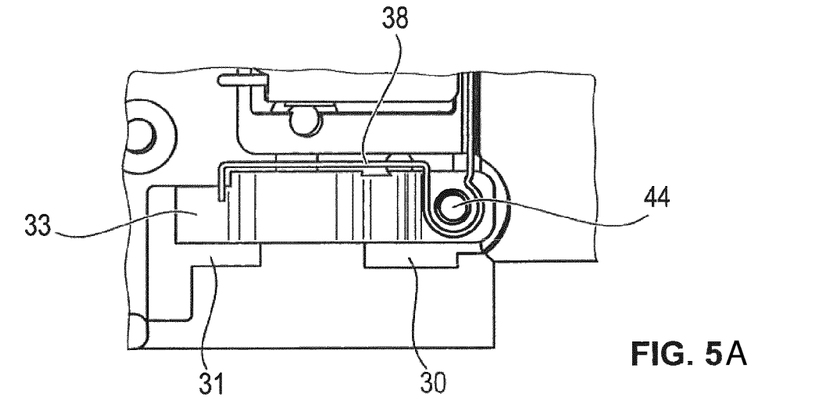
FIGS. 5A to 5C are top plan views showing the thermal fuse with a spring-loaded contact bridge in a contact position, in a pivoted position and in a tripped position.
Figure 5B:
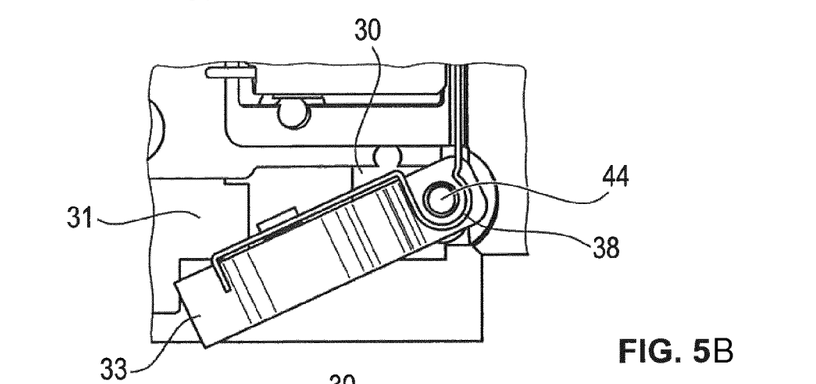
Figure 5C:
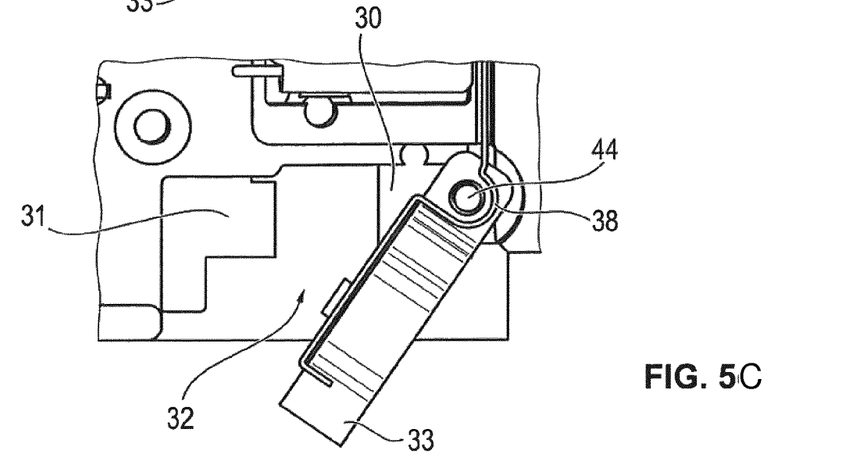

On the basis of FIGS. 5A to 5C it is shown how, in the event of tripping once the solder of the soldered points has melted, the contact bridge 33 and also the spring element 38 pivot about the pin 44 and thus about the axis. The pivot axis 43 lies here in the vicinity of the contact surface 37. There, the contact bridge 33 has a bore, through which the pin 44 is passed.

The thermal fuse 24 trips in particular in the event of an over-temperature, in that the solder melts and the contact bridge pivots through a combined rotary and shearing movement on account of the spring force of the spring element 38, such that the interruption point 32 bridged by the preloaded contact bridge 33 is interrupted. The contact bridge 33 pivots in the event of tripping from a first position (contact position) into a second position (tripped position), wherein the pivot movement is performed about the pivot axis 43 and in the plane of the interruption point 32.

The invention is not limited to the above-described exemplary embodiments. Rather, other variants of the invention can also be derived herefrom by a person skilled in the art without departing from the subject matter of the invention. In particular, all individual features described in conjunction with the individual exemplary embodiments can also be combined with one another in a different way without departing from the subject matter of the invention.

The following is a summary list of reference numerals and the corresponding structure used in the above description of the invention:

1 fan
2 fan wheel
3 cap
4 air-guiding blade
5 fan/motor
6 stator
7 rotary field winding
8 rotor
9 motor axis
10 rolling bearing
11 rolling bearing
12 spring ring
13 motor mount
14 electronics compartment
15 converter/electronics
16 electronics compartment lid
17 axis pin
18 screw dome
19 end face
20 overmolded punched grid
21 printed circuit board
22 semiconductor component
23 capacitors
24 thermal fuse
25 input connection
26 output connection
27 sensor signal outputs
28 punched grid
29 plastic overmold
30 first current path end
31 second current path end
32 interruption point
33 contact bridge
34 first contact point of the punched grid
35 second contact point of the punched grid 36 first contact point of the contact bridge
37 second contact point of the contact bridge
38 spring element
39 first spring leg
40 second spring leg
41 receiving compartment of the plastic overmold
42 leg/spring eyelet
43 pivot axis
44 pin
45 bend
46 guide element
46a groove
46b spring

The invention claimed is:

1. An electric motor for driving a motor vehicle component, the electric motor comprising:
   a stator;
   a rotor mounted rotatably relative to said stator; and
   an electronics system having a plastic over-mold, a punched grid covered by said plastic over-mold and a current path conducting a motor current, said current path having a thermal fuse, two current path ends lying in a same plane and spaced apart from one another forming an interruption point being bridged by said thermal fuse, said thermal fuse having a spring-loaded contact bridge, said spring-loaded contact bridge being held pivotably about a pivot axis extending perpendicularly to a plane in which said interruption point lies, said thermal fuse having a spring element with a first spring leg and a second spring leg extending at right angles to said first spring leg, said spring-loaded contact bridge being associated with said spring element, said spring-loaded contact bridge, when said thermal fuse trips, pivots in a manner of a combined rotary and shearing movement in a plane of the interruption point, as a result of a spring return force of said spring element.

2. The electric motor according to claim 1, wherein said spring element has a spring eyelet and said first and second spring legs transition into one another via said spring eyelet, said spring eyelet in a mounted state of said spring element coaxially surrounds the pivot axis.

3. The electric motor according to claim 2, wherein in an assembled state of said spring element, said spring eyelet surrounds said pivot axis coaxially.

4. The electric motor according to claim 1, wherein:
   said first spring leg bears against said spring-loaded contact bridge under a spring preload; and
   said plastic over-mold has a storage compartment and said second spring leg lies in said storage compartment of said plastic over-mold.

5. The electric motor according to claim 1, wherein said spring element is a groove-spring connection.

6. The electric motor according to claim 1, wherein said thermal fuse has a guide element, said spring element and said spring-loaded contact bridge are coupled via said guide element.

7. The electric motor according to claim 1, wherein said first spring leg has a leg end and is bent at said leg end.

8. The electric motor according to claim 1, wherein said pivot axis is formed from said plastic over-mold.

9. The electric motor according to claim 1, wherein said spring-loaded contact bridge has, at both ends, contact surfaces contacted with one of said path ends, wherein said pivot axis lies in a region of one of said contact surfaces.

10. The electric motor according to claim 9, wherein both of said contact surfaces of said spring-loaded contact bridge are soldered to said current path ends.

11. The electric motor according to claim 1, wherein said spring-loaded contact bridge is formed as, or in a manner of a punched and bent part having a number of bends forming a middle raised bridge portion.

12. The electric motor according to claim 1, wherein the electric motor drives a fan wheel for cooling coolant water.

* * * * *